(12) United States Patent
Chung

(10) Patent No.: US 8,176,760 B2
(45) Date of Patent: May 15, 2012

(54) KEY INTERLOCK DEVICE FOR STEERING COLUMN LOCK DEVICE

(75) Inventor: Jin-Sang Chung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 1094 days.

(21) Appl. No.: 11/591,771

(22) Filed: Nov. 2, 2006

(65) Prior Publication Data

US 2007/0131004 A1   Jun. 14, 2007

(30) Foreign Application Priority Data

Dec. 9, 2005   (KR) ........................ 10-2005-0121085

(51) Int. Cl.
*B60R 25/02* (2006.01)
*E05B 65/12* (2006.01)

(52) U.S. Cl. ............................. 70/252; 70/186; 340/456

(58) Field of Classification Search ............ 70/181–187, 70/252, 256, 257; 340/5.1, 456
See application file for complete search history.

(56) References Cited

U.S. PATENT DOCUMENTS

| | | | | |
|---|---|---|---|---|
| 5,124,565 A | * | 6/1992 | Yoshida et al. ................. | 70/252 |
| 5,554,891 A | * | 9/1996 | Shimizu et al. .......... | 340/426.28 |
| 5,982,295 A | * | 11/1999 | Goto et al. ....................... | 70/252 |
| 6,260,651 B1 | * | 7/2001 | Kokubu et al. .................. | 70/252 |
| 6,380,642 B1 | * | 4/2002 | Buchner .......................... | 70/252 |
| 6,989,611 B2 | * | 1/2006 | Hayashi et al. .............. | 307/10.2 |
| 7,145,264 B2 | * | 12/2006 | Nagae et al. ................. | 307/10.2 |
| 7,250,693 B2 | * | 7/2007 | Hayashi et al. .............. | 307/10.2 |
| 7,302,817 B2 | * | 12/2007 | Ohtaki et al. ................... | 70/186 |
| 2004/0003632 A1 | * | 1/2004 | Ohtaki et al. .................... | 70/252 |
| 2007/0138869 A1 | * | 6/2007 | Otani et al. .................... | 307/9.1 |

FOREIGN PATENT DOCUMENTS

| | | | |
|---|---|---|---|
| EP | 1359068 A1 | * | 11/2003 |
| JP | 2003-237537 A | | 8/2003 |
| JP | 2003-341477 A | | 12/2003 |
| KR | 10-2002-0096191 A | | 12/2002 |
| KR | 10-2003-0096944 A | | 12/2003 |
| KR | 10-2004-0047114 A | | 6/2004 |

* cited by examiner

*Primary Examiner* — Suzanne Barrett
*Assistant Examiner* — Christopher Boswell
(74) *Attorney, Agent, or Firm* — Morgan, Lewis & Bockius LLP

(57) ABSTRACT

According to the present invention, a key interlock device for a steering column lock device realizes rapid and smooth operation so as not to inconvenience a user, and, when a gear shift lever is switched between a P range and R range, does not generate noise due to performance of a key interlock function in the key interlock device implemented in the steering column lock device of a smart key system.

4 Claims, 5 Drawing Sheets

KEY INTERLOCK DEVICE FOR STEERING COLUMN LOCK DEVICE

CROSS-REFERENCE TO RELATED APPLICATIONS

The present application is based on, and claims priority from, Korean Application Serial Number 10-2005-0121085, filed on Dec. 9, 2005, the disclosure of which is hereby incorporated by reference herein in its entirety.

FIELD OF THE INVENTION

The present invention relates generally to a key interlock device for a steering column lock device and, more particularly, to a key interlock device implemented in a steering column lock device used for smart key systems.

BACKGROUND OF THE INVENTION

A typical smart key system operates as follows. Upon opening a door of a vehicle by use of a FOB key, a Personal Identification Card Electronic Control Unit (PIC ECU) wakes up a Mechatronic Steering Column Lock (MSCL) controller. When all the doors of the vehicle are subsequently closed, the PIC ECU operates an interior antenna and checks whether a valid FOB key exists inside the vehicle. After authentication of validity of the FOB key and a user pushes a knob of a steering column lock device, a knob-push switch detects this and transmits it to the PIC ECU. The PIC ECU transmits a command directing the MSCL controller to release a locked state. Next, the MSCL controller supplies electricity to a solenoid which locks the knob, so that the knob is caused to be rotatable, thereby making starting of the vehicle possible.

SUMMARY OF THE INVENTION

According to some embodiments of the present invention, a key interlock device for a steering column lock is disclosed. The key interlock realizes rapid and smooth operation so as not to inconvenience a user. When a gear shift lever is switched between a P range and R range the key interlock device does not generate noise due to the performance of a key interlock function of the key interlock device implemented in the steering column lock of a smart key system.

In some embodiments, a key interlock device for a steering column lock includes a key interlock switch for detecting whether a gear shift lever is in a P range. The key interlock device also includes a Personal Identification Card Electronic Control Unit (PIC ECU) for receiving a signal from the key interlock switch. A Mechatronic Steering Column Lock (MSCL) controller is controlled by the PIC ECU. A solenoid is controlled by the MSCL controller and a locking lever is operated by the solenoid. Also included is a cam shaft having a cam, wherein rotation of the cam is switched by an operational state of the solenoid. A plunger is included for rotating the cam shaft and a knob is coupled to the plunger. A slider, capable of linearly moving to be away from or close to the plunger in a direction perpendicular to a rotational axis of the plunger, moves in response to linear movement or rotational movement of the plunger. A knob switch is turned on when the slider moves away from the plunger and a first control groove and a second control groove are formed in the plunger. The first control groove guides the slider away from the plunger when the knob pushes the plunger in a LOCK position, thereby keeping the slider away from the plunger when the knob is in an ACC position and keeping the slider into the second control groove of the plunger when the knob is an ON state.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
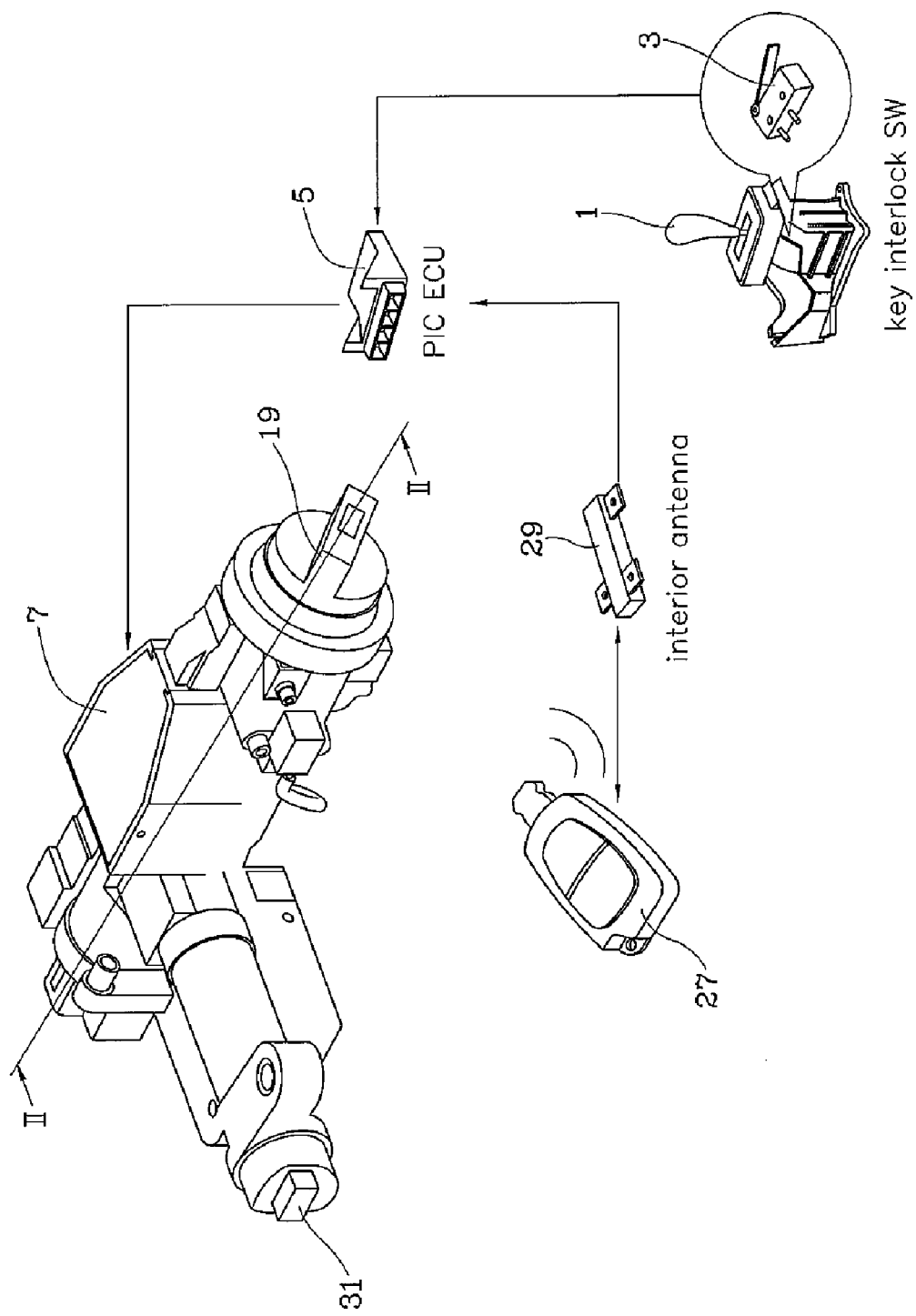
FIG. 1 illustrates an embodiment of a smart key system in which the present invention is implemented.
Figure 2:
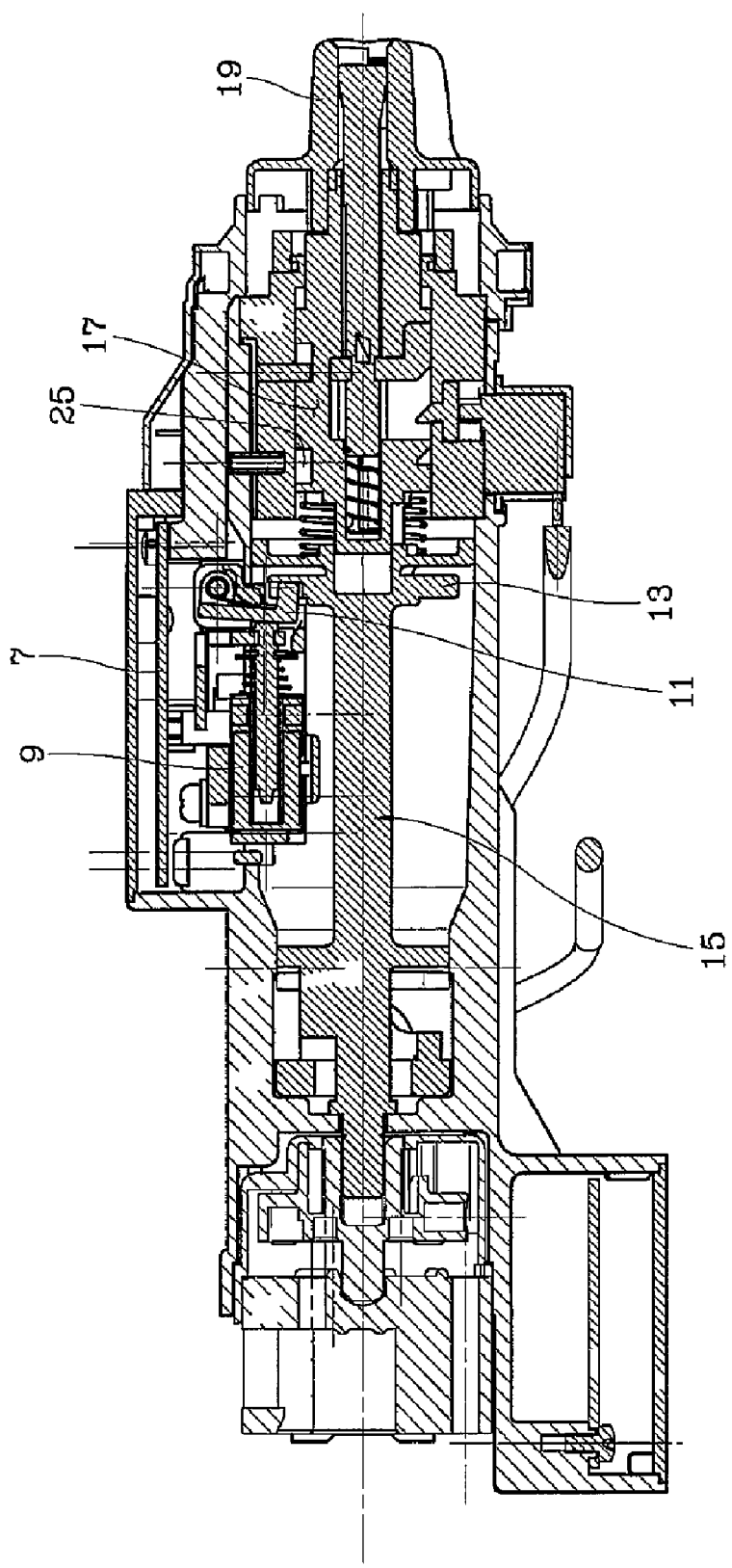
FIG. 2 illustrates a sectional view taken along line II-II of FIG. 1.

A preferred embodiment of the present invention is described with reference to the accompanying drawings below. Referring now to FIGS. 1 to 6, an embodiment of the present invention includes a key interlock switch 3 for detecting whether a gear shift lever 1 is in the P range. A PIC ECU 5 for receiving a signal from the key interlock switch 3. Also included is an MSCL controller 7, controlled by the PIC ECU 5, and a solenoid 9 controlled by the MSCL controller 7. A locking lever 11 is operated by the solenoid 9 and a cam shaft 15 with a cam 13, wherein the cam shaft is rotatably switched by the operational state of the solenoid. A plunger 17 is included for rotating the cam shaft 15 and a knob 19 is coupled to the plunger 17. A slider 21 is configured to linearly move away from or close to the plunger in a direction perpendicular to the rotational axis of the plunger and in response to linear movement or rotational movement of the plunger 17. A knob switch 23 is turned on when the slider moves away from the plunger 17 and a first control groove 25 is formed in the plunger 17, guiding the slider 21 to move away from the plunger 17 when the knob 19 pushes the plunger 17 in a LOCK position and keeping the slider 21 away from the plunger 17 when the knob 19 is at an ACC position or keeping the slider 21 into a second groove 26 of the plunger 17 when the knob is in an ON state.

The knob 19, the plunger 17 and the cam shaft 15 are coupled to each other to rotate together. The knob switch 23 is coupled to the MSCL controller 7 in series with the solenoid 9, so that the solenoid 9 does not work as long as the knob switch 23 is not turned on, even if the MSCL controller 7 supplies electricity and operates the solenoid 9.

After checking that a valid FOB key 27 is present inside of a vehicle, the PIC ECU 5 transmits a release command to the MSCL controller 7. When receiving the release command, the MSCL controller 7 applies electricity to the solenoid 9 that enables rotational movement of the cam shaft 15. Furthermore, after checking, through the key interlock switch 3, that the gear shift lever 1 is in a state other than the P range, the PIC ECU transmits a preliminary interlock command to the MSCL controller 7. When receiving the preliminary interlock command, the MSCL controller 7 applies electricity to the solenoid 9 that locks the rotational movement of the cam shaft 15.

When an operator opens a door of a vehicle using the FOB key 27, the PIC ECU 5 wakes up the MSCL controller 7. When the operator closes all doors of the vehicle that are open, the PIC ECU 5 operates an interior antenna 29 and then checks whether an valid FOB key 27 is present inside the vehicle. If the valid FOB key 27 is detected, the PIC ECU 5 transmits the release command to the MSCL controller 7. When receiving the release command, electricity provided by the MSCL controller 7 is not applied to the solenoid 9, so that the locking lever 11 is in a state of locking the cam 13 of the cam shaft 15 not to be rotated.

The LOCK position is the position at which a steering column lock bar 31 locks a steering column, and in which the operator cannot rotate the knob 19 to an ACC position, an ON position, or a START position through simple manipulation (the knob 19 can be rotated in a pressed state). Furthermore, in the LOCK position, the plunger 17 is not pushed forward. The cam shaft 15 and the slider 21 is inserted into the first control groove 25 of the plunger 17, as illustrated in FIG. 5(A), so that the knob switch 23 is maintained in an off state. The operator releases the LOCK position, and then pushes the knob 19 toward the cam shaft 15, which then linearly moves, in order to try to start the vehicle. Thereafter, the operator rotates the knob 19 to the ACC position, the ON position, or the START position.

Figure 3:
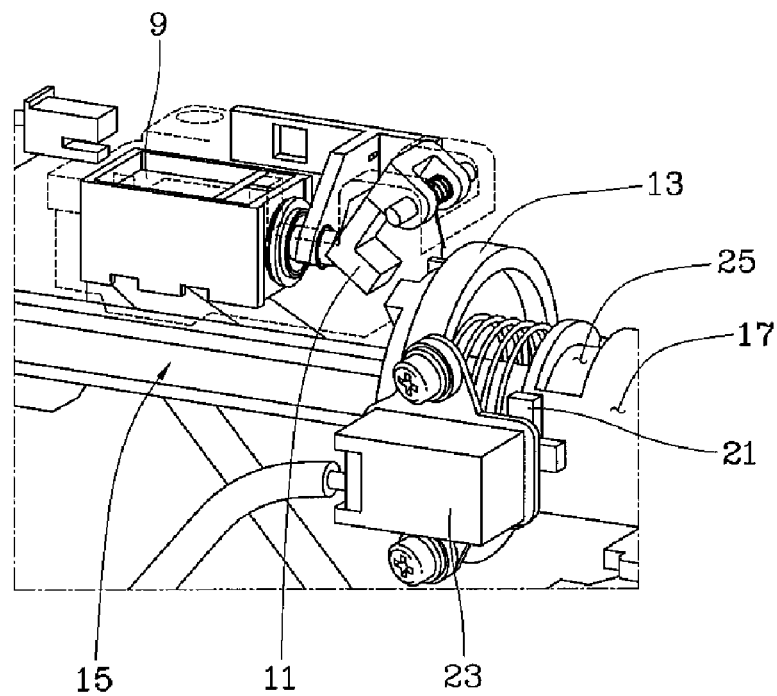
FIG. 3 illustrates a condition where a locking lever releases a locked state such that a cam of a cam shaft is rotatable according to an embodiment of the present invention.
Figure 4:
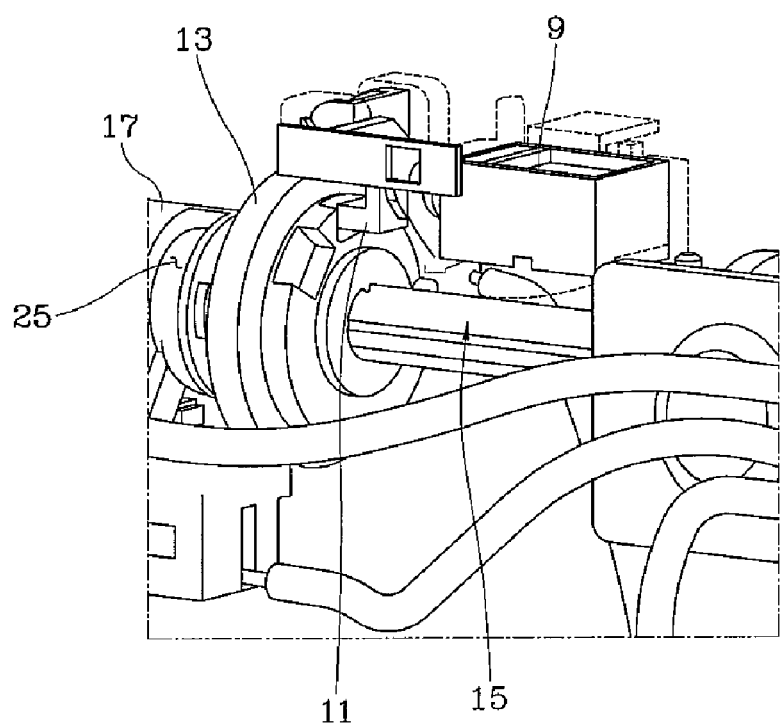
FIG. 4 illustrates a condition where a locking lever locks rotational movement of a cam shaft when in an ACC position, as observed from the opposite side of FIG. 3.
Figure 5:
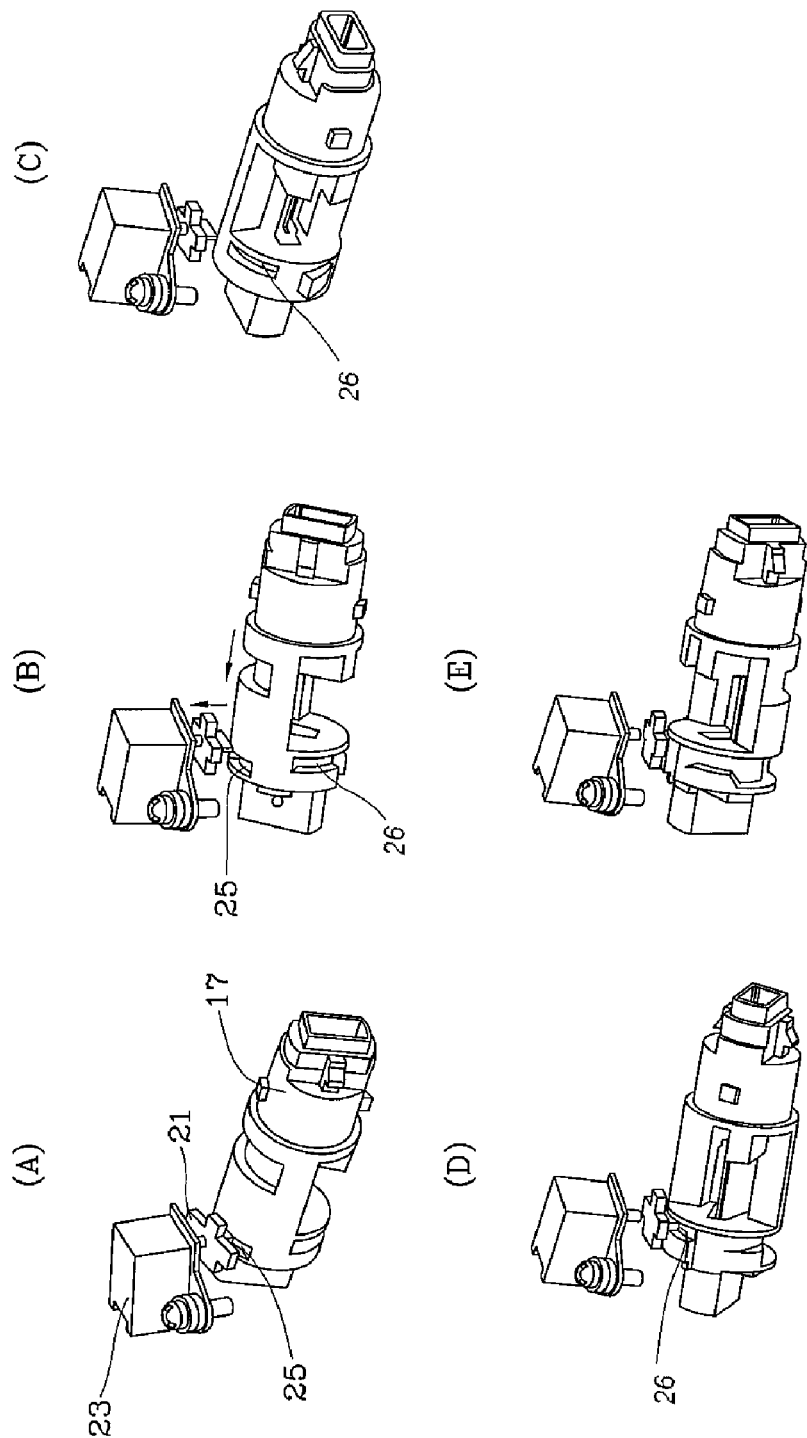
FIG. 5 illustrates a comparison of operational states of a slider and a knob switch according to rotational movement of a plunger, according to an embodiment of the present invention.
Figure 6:
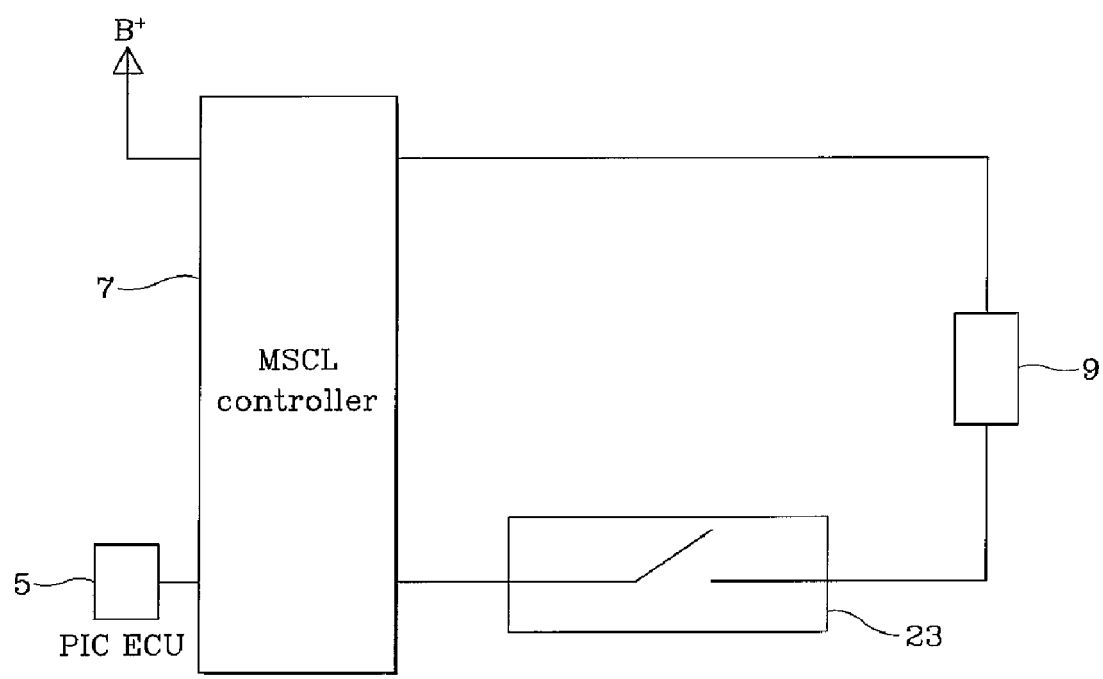
FIG. 6 illustrates a state in which a solenoid and a knob switch are coupled in series to an MSCL controller, according to an embodiment of the present invention.

When the knob 19 is pushed toward the cam shaft 15, the plunger 17 linearly moves, as illustrated in FIG. 5(B). The slider 21 slides out of the first control groove 25 while moving in a direction of being away from the plunger 17 and then turns on the knob switch 23. Therefore, electricity, supplied by the MSCL controller 7, passes through the knob switch 23 and is applied to the solenoid 9. The locking lever 11 is rotated and releases the locked state of the cam 13, as illustrated in FIG. 3. Thereby, the operator is able to rotate the knob to the ACC position, the ON position or the START position.

When the operator merely pushes the knob 19 toward the cam shaft 15, as described above, the electricity, which is previously applied by the MSCL controller 7, is immediately applied to the solenoid 9 by the knob switch 23 so that the locking lever 11 releases the locked state of the cam shaft 15. Therefore, even if the operator very rapidly manipulates the knob 19 to rotate it from the LOCK position to the START position, there is no possibility for the rotational movements of the knob 19, plunger 17, and the cam shaft 15 to be restricted by the locking lever 11.

When the knob 19 is rotated to the ACC position, the plunger 17 is in the state illustrated in FIG. 5(C), thereby maintaining the knob switch 23 in the ON position. When the knob 19 is rotated to the ON position, the plunger 17 is in the state illustrated by FIG. 5(D), and the slider 21 is inserted into the second control groove 26, thereby causing the knob switch 23 to be in an off state. Even in the case in which the knob 19 is rotated to the START position, the slider 21 is maintained inserted into the second control groove 26 of the plunger 17, so that the knob switch 23 is maintained in the off state, as illustrated in FIG. 5(E). In other words, the slide 21 slides out of the first control groove 25 and moves away from the plunger 17 to turn on the knob switch 23 where the plunger 17 is pushed toward the cam shaft 15 in the LOCK position and in the ACC position, and, in other cases, is inserted into the second control groove 25, thereby turning off the knob switch 23.

If the PIC ECU has checked that the gear shift lever 1 is in a state other than the P range, through the interlock switch 3 when the knob 19 is in the ON position or the START position, the PIC ECU transmits the preliminary interlock command to the MSCL controller 7. When receiving the preliminary interlock command, the MSCL controller 7 applies electricity to the solenoid 9, which locks the rotational movement of the cam shaft 15. However, when the knob is in the ON position or the START state, the knob switch 23 is in the off state, as described above, so that electricity is not applied from the MSCL controller 7 to the solenoid 9.

Therefore, the lock lever 11 does not lock the cam 13 so the cam shaft 15 can be rotated from the ON position to the ACC position. Furthermore, even if the operator repeatedly switches the gear shift lever 1 between the P range and the R range such that an action in the PIC ECU transmits the preliminary interlock command to the MSCL controller 7 and the MSCL controller 7 applies electricity to the solenoid 9 the locking lever 11 does not move, thereby preventing unnecessary noise due to the movement of the locking lever 11.

If the knob 19 is erroneously manipulated, for example due to an operator's carelessness or to an unattended child's mischief, such that the knob 19 is rotated from the ON position to the ACC position during traveling of the vehicle, the slider 21 slides out of the first control groove 25 and turns on the knob switch 23. The solenoid 9 then operates the locking lever 11, using electricity provided by the MSCL controller 7 through the knob switch 23, to prevent the cam 13 from rotating, as illustrated FIG. 4. As a result, the knob 19 does not rotate from the ACC position to the LOCK position, so that the steering column lock bar 31 does not lock the steering column, thereby performing a key interlock function.

According to the above-described present invention, the key interlock device implemented in the steering column lock device of a smart key system provides rapid and smooth operation so as not to inconvenience a user. Also, when a gear shift lever is switched between the P range and the R range a noise is not generated by the performance of the key interlock function. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A key interlock device for a steering column lock device, comprising:
   a key interlock switch configured to detect whether a gear shift lever is in a P range;
   a Personal Identification Card Electronic Control Unit (PIC ECU) for receiving a signal from the key interlock switch;
   a Mechatronic Steering Column Lock (MSCL) controller configured to be controlled by the PIC ECU;
   a solenoid configured to be controlled by the MSCL controller;
   a locking lever configured to be operated by the solenoid;
   a cam shaft having a cam, wherein the locking lever selectively locks the cam;
   an axially slidable plunger engaged to the cam shaft to rotate the cam shaft;
   a knob coupled to the plunger;

a slider radially movable away from and toward the plunger in response to axial movement or rotational movement of the plunger;

a knob switch configured to be turned on when the slider moves away from the plunger to send a signal to the MSCL controller to activate the solenoid to unlock the cam; and a control groove formed in the plunger for guiding the slider toward the plunger and turning off the knob switch when the knob is in a LOCK position, for guiding the slider away from the plunger and turning on the knob switch when the knob is in an ACC position, and for guiding the slider toward to the plunger and turning off the knob switch when the knob is in an ON state.

2. The key interlock device as defined in claim 1, wherein the knob switch, the MSCL controller, and the solenoid are coupled in series.

3. The key interlock device as defined in claim 2, wherein:
the PIC ECU transmits a release command to the MSCL controller when checking that a valid FOB key is present inside a vehicle; and
the MSCL controller applies electricity to the solenoid when receiving the release command, which enables the rotational movement of the cam shaft.

4. The key interlock device as defined in claim 2, wherein:
the PIC ECU transmits a preliminary interlock command to the MSCL controller when checking that the gear shift lever is in a state other than the P range, through the key interlock switch; and
the MSCL controller applies electricity to the solenoid when receiving the preliminary interlock command, which locks the rotational movement of the cam shaft.

* * * * *